(12) United States Patent
Schnell et al.

(10) Patent No.: US 7,793,487 B1
(45) Date of Patent: Sep. 14, 2010

(54) PULL TYPE GANG MOWER

(75) Inventors: Timothy Schnell, Macclesfield, NC (US); Terry Strickland, Spring Hope, NC (US); Dale Strickland, Spring Hope, NC (US)

(73) Assignee: Wings Product Development Corporation, Macclesfield, NC (US)

( * ) Notice: Subject to any disclaimer, the term of this patent is extended or adjusted under 35 U.S.C. 154(b) by 20 days.

(21) Appl. No.: 11/672,721

(22) Filed: Feb. 8, 2007

Related U.S. Application Data

(63) Continuation-in-part of application No. 10/724,807, filed on Dec. 1, 2003, which is a continuation-in-part of application No. 10/293,640, filed on Nov. 13, 2002, now abandoned.

(51) Int. Cl.
*A01D 75/30* (2006.01)
(52) U.S. Cl. .............................. 56/6; 56/11.6
(58) Field of Classification Search ...... 56/6, 56/15.3, 15.7, 15.8, 7, 11.6
See application file for complete search history.

(56) References Cited

U.S. PATENT DOCUMENTS

| | | | |
|---|---|---|---|
| 1,561,569 A | 11/1925 | Roseman | |
| 2,682,740 A | 7/1954 | Miller et al. | |
| 2,720,740 A | 10/1955 | Howell | |
| 2,771,730 A * | 11/1956 | True | 56/11.6 |
| 3,208,207 A | 9/1965 | Bottenberg | |
| 3,473,302 A | 10/1969 | Caldwell | |
| 3,514,126 A | 5/1970 | Fuss | |
| 3,608,284 A | 9/1971 | Erdman | |
| 3,699,752 A | 10/1972 | Dandl | |
| 3,950,923 A | 4/1976 | Martensen et al. | |
| 4,135,349 A | 1/1979 | Schwertner | |
| 4,160,356 A | 7/1979 | Mathews | |
| 4,304,086 A | 12/1981 | Stuchl | |
| 4,346,547 A | 8/1982 | Allison | |
| 4,395,865 A * | 8/1983 | Davis et al. | 56/13.3 |
| 4,420,925 A | 12/1983 | Webster | |
| 4,691,504 A | 9/1987 | Glunk | |
| 4,697,404 A | 10/1987 | Brockmeier et al. | |
| 4,723,404 A | 2/1988 | Aron | |
| 4,815,259 A | 3/1989 | Scott | |
| 4,858,417 A | 8/1989 | Priefert et al. | |
| 4,870,810 A | 10/1989 | Gordy | |
| 4,901,507 A | 2/1990 | Cracraft | |
| 4,926,621 A | 5/1990 | Torras | |
| 5,042,236 A * | 8/1991 | Lamusga et al. | 56/7 |
| 5,062,489 A | 11/1991 | Adee | |
| 5,069,022 A | 12/1991 | Vandermark | |
| 5,109,655 A | 5/1992 | Tekulve | |

(Continued)

*Primary Examiner*—Alicia M Torres
(74) *Attorney, Agent, or Firm*—Coats & Bennett, P.L.L.C.

(57) ABSTRACT

A gang-type lawn mower system comprises a main frame or frame structure and a plurality of mower decks secured to the main frame. Mounted on the main frame is a power source such as an internal combustion engine. A drive train is interconnected between the power source and each of the mower decks. Thus, each mower deck is driven by the single power source. Further, the frame structure includes a tongue that is adapted to be connected to a tractor. Therefore, in cutting grass, the frame structure is pulled over the ground and each of the mower decks, driven by the power source, cuts grass or other vegetation that passes under the mower decks. Additionally, each mower deck is pivotally connected to the frame structure about at least one pivot axis.

20 Claims, 9 Drawing Sheets

U.S. PATENT DOCUMENTS

| | | |
|---|---|---|
| 5,133,174 A | 7/1992 | Parsons, Jr. |
| 5,233,817 A | 8/1993 | Nicol |
| 5,771,669 A | 6/1998 | Langworthy et al. |
| 5,851,020 A | 12/1998 | Godwin et al. |
| 6,038,842 A | 3/2000 | Quiroga |
| 6,047,530 A * | 4/2000 | Bednar ............................ 56/6 |
| 6,065,274 A | 5/2000 | Laskowski et al. |
| 6,098,388 A * | 8/2000 | Davies ........................ 56/249 |
| 6,131,378 A | 10/2000 | Lees |
| 6,336,311 B1 | 1/2002 | Bednar |
| 6,336,312 B1 | 1/2002 | Bednar et al. |
| 6,557,330 B2 * | 5/2003 | Hubscher .................... 56/10.8 |
| 7,293,398 B2 * | 11/2007 | Koehn ........................ 56/15.9 |
| 2002/0053194 A1 | 5/2002 | Bergsten et al. |
| 2002/0078672 A1 | 6/2002 | Hubscher |
| 2004/0221561 A1 * | 11/2004 | Koehn ........................ 56/15.9 |

\* cited by examiner

PULL TYPE GANG MOWER

CROSS REFERENCE TO RELATED APPLICATION

This is a continuation-in-part of U.S. patent application Ser. No. 10/724,807 filed on Dec. 1, 2003 and entitled "Pull Type Gang Mower," which is a continuation-in-part of U.S. patent application Ser. No. 10/293,640, filed on Nov. 13, 2002 and entitled "Pull Type Gang Mower."

FIELD OF THE INVENTION

The present invention relates to gang-type lawn mower systems and more particularly to a pull-type frame structure having a series of mower decks secured thereto with each mower deck powered by a single power source.

BACKGROUND OF THE INVENTION

Many homeowners are fortunate to own one to five acre tracts of land. In many of these cases, these homeowners will have lawns as large as one to four acres. These large lawns are certainly picturesque and add a quality to a home or homestead that is desirable. But like other things of beauty, a large lawn comes with a price. The time and effort required to cut such lawns can be burdensome.

The homeowner has a number of options. First, these large lawns can be cut with walk-behind mowers, either propelled or unpropelled. In either case, cutting a large lawn with a walk-behind mower is extremely time-consuming. Another option entails the use of a conventional garden tractor. However, again a conventional garden tractor will only cut a swath so wide and therefore the homeowner will find him or herself riding a garden tractor for hours. There are faster ways to cut large lawns. One is to employ a small farm tractor with a large rotary mower that would be attached either under the belly of the tractor or behind the tractor. Of course, there is an expense involved in purchasing a small farm tractor and a sizeable rotary cutter. Further, many homeowners with large lawns do not have outbuildings or garage space to store a small farm tractor.

There have been attempts at designing gang-type lawn mowers that could be pulled by a garden tractor or a small farm tractor. See for example, the disclosures found in the following U.S. Pat. Nos. 5,771,669; 5,133,174; 5,851,020; 4,926,621; 3,514,126; 4,870,810; and 3,608,284. The disclosure of these patents is expressly incorporated herein by reference. Most of the gang-type mower systems disclosed in these patents utilizes a series of lawn mowers coupled together where each lawn mower includes its own power source. This makes the entire system expensive and impractical.

Therefore, there has been and continues to be a need for an economical and practical gang-type lawn mower system that can be pulled by a conventional garden tractor or small farm tractor.

SUMMARY OF THE INVENTION

Disclosed herein is a gang-type lawn mower system comprising a main frame, an engine mounted on the main frame, a pair of mower decks with each mower deck being disposed on one side of the main frame. Each mower deck includes one or more blades and there is provided a belt drive operatively connected to the engine and extending from the main frame to the mower decks for transferring power from the engine to each of the mower decks. In one embodiment, the gang-type lawn mower system includes a biasing assembly interconnected between the main frame and the mower decks for biasing each of the mower decks outwardly and away from the main frame. In another embodiment the present invention includes a lawn mower system that includes a connecting assembly that connects each of the mower decks with the main frame such that each mower deck can pivot about at least three axes with respect to the main frame.

In another embodiment, the present invention includes a lawn mower system of the general type described above where the main frame includes a deck for supporting the engine and a pair of front wheels connected to a wheel frame, and wherein the wheel frame is pivotally connected to the deck of the main frame. There is also provided a height adjustment mechanism for adjusting the height of the deck of the main frame with respect to the wheel frame.

Other objects and advantages of the present invention will become apparent and obvious from a study of the following description and the accompanying drawings which are merely illustrative of such invention.

DESCRIPTION OF AN EXEMPLARY EMBODIMENT

Figure 1:
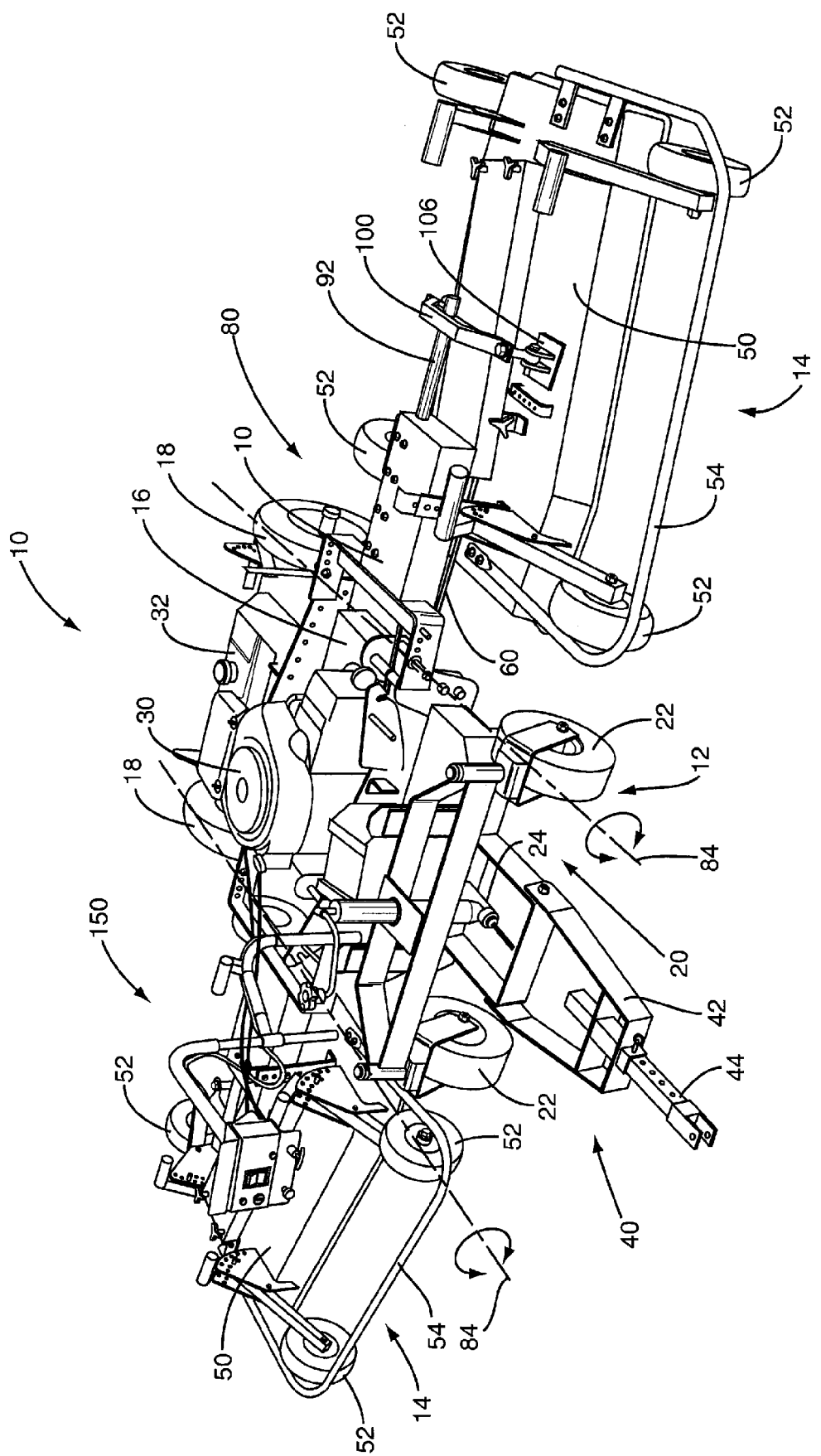
FIG. 1 is a perspective view of the pull-type, gang-type lawn mower system of the present invention.

With further reference to the drawings, a gang-type lawn mower system is shown therein and indicated generally by the numeral 10. The gang-type lawn mower system 10 is adapted to be attached to a tractor or other mobile device and pulled over an area. Forming a part of the gang-type lawn mower system 10 is a main frame indicated generally by the numeral 12 and a pair of mower decks, each indicated generally by the numeral 14. Main frame 12 is centrally located with each mower deck 14 being disposed on one side of the main frame. Main frame 12 is designed to be generally aligned with the tractor to which the lawn mower system 10 is connected.

Figure 2:
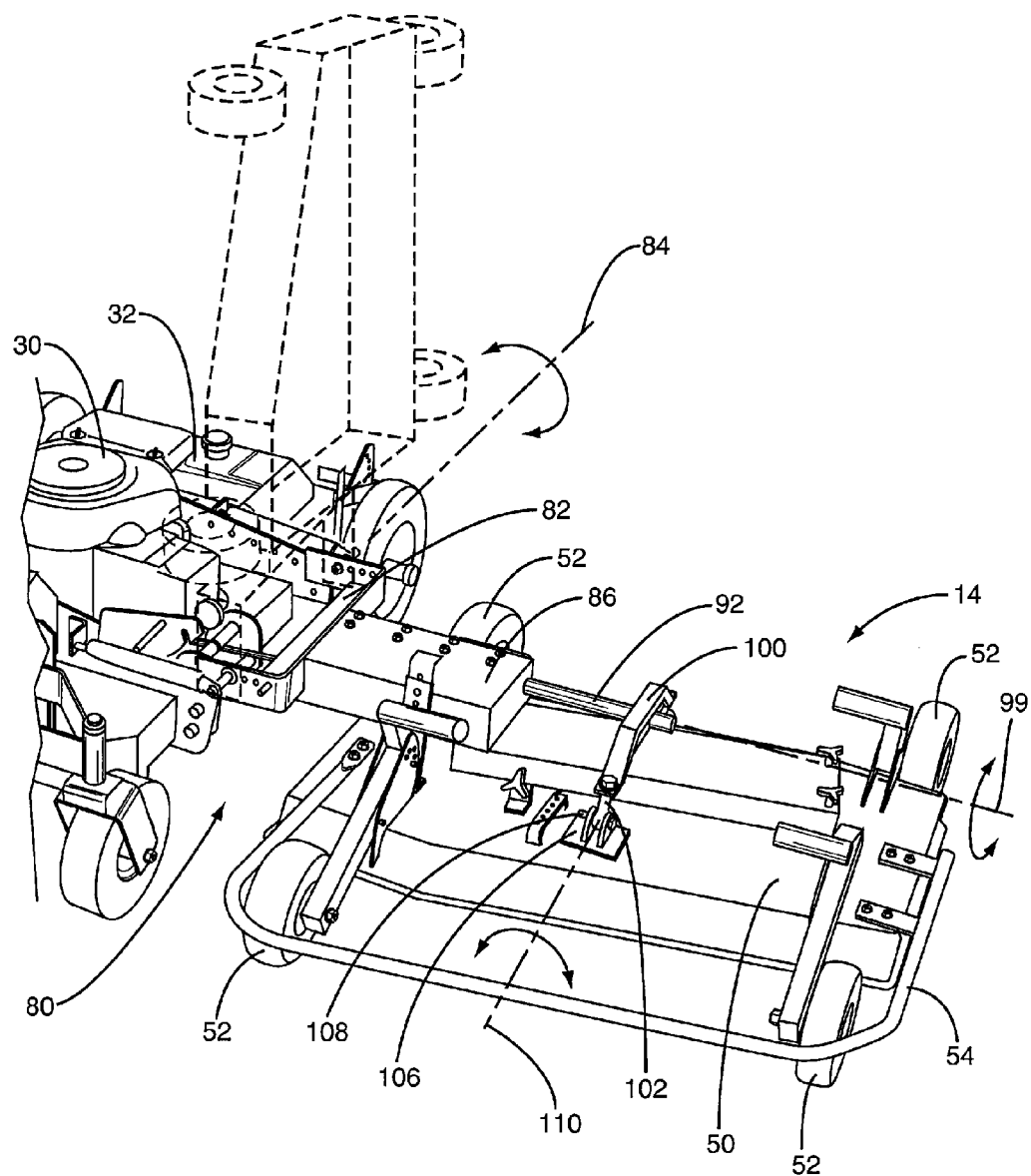
FIG. 2 is a perspective view of a portion of the lawn mower system.
Figure 3:
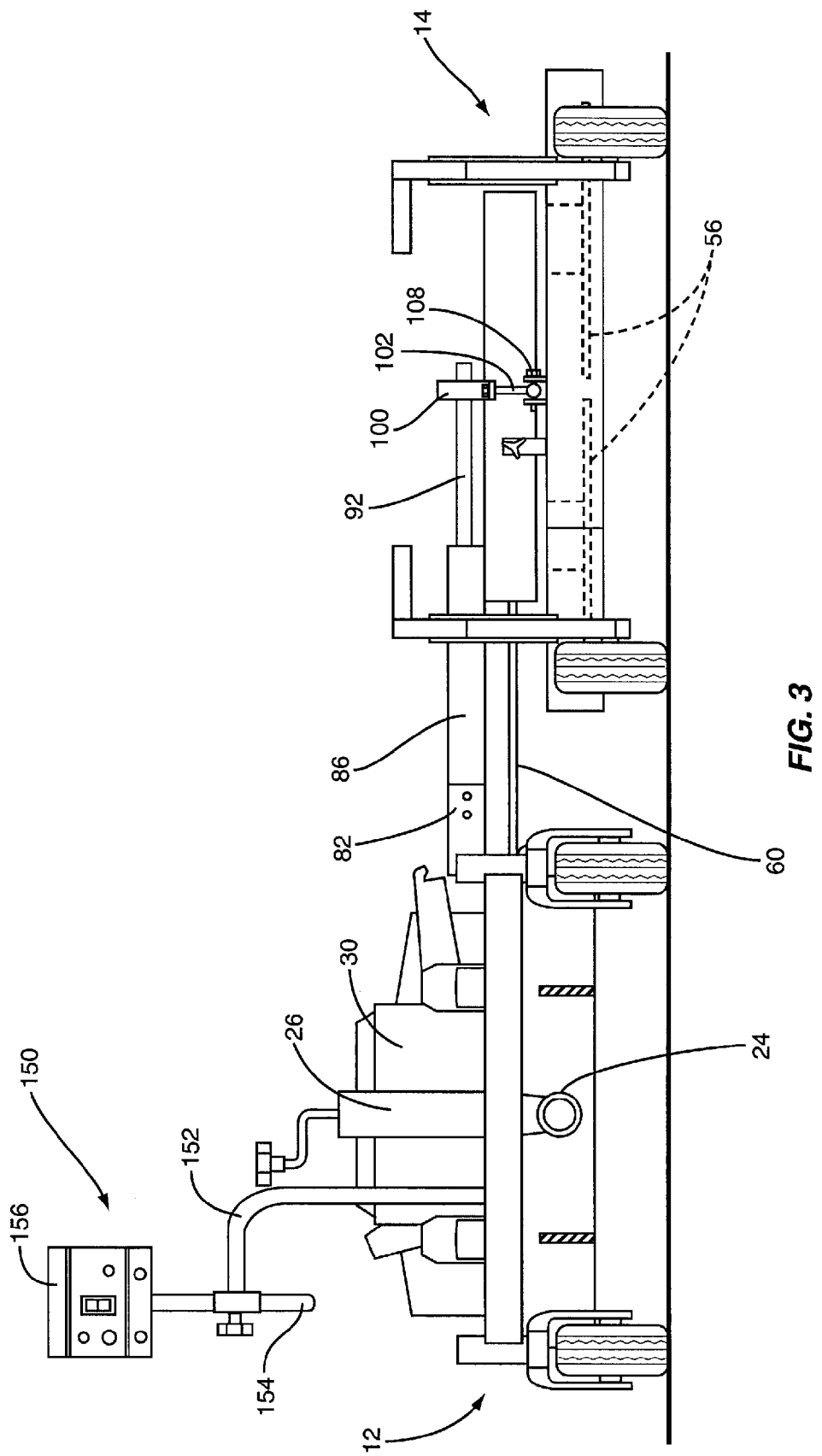
FIG. 3 is a rear elevational view of a portion of the lawn mower system showing one mower deck in the horizontal operative position.
Figure 4:
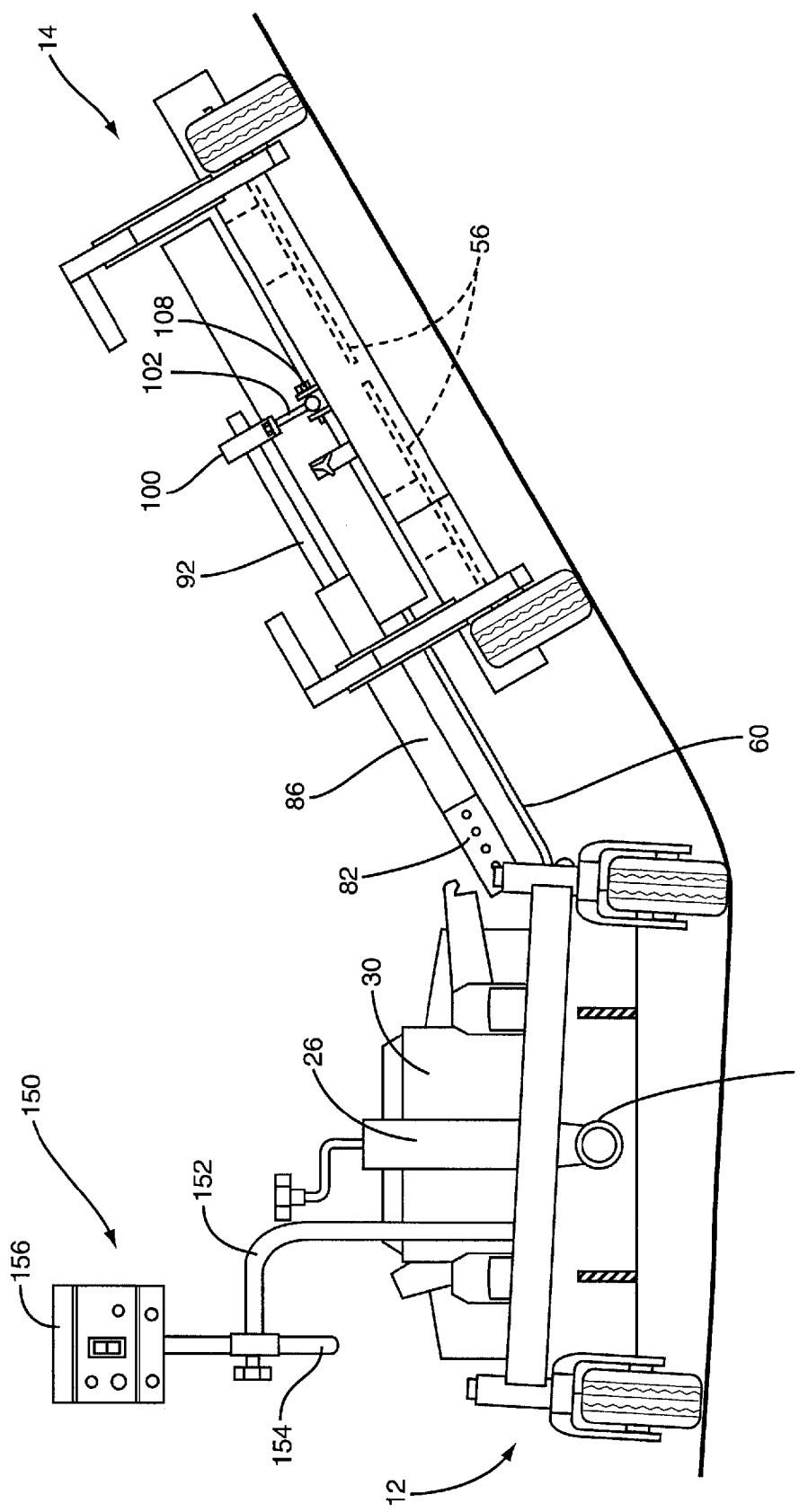
FIG. 4 is a view similar to FIG. 3, but showing the mower deck transversing an incline.

As seen in FIGS. 1 and 2 for example, main frame 12 includes a deck or housing indicated generally by the numeral 16. Secured to the rear of the deck 16 is a pair of adjustable rear wheels 18. Secured to the front of the deck 16 is a wheel frame indicated generally by the numeral 20 and a pair of front wheels 22 that depend from the wheel frame. Wheel frame 20 is pivotally connected to deck 16 such that as the mower system 10 traverses undulations in the ground, the deck 16 of the main frame 12 can pivot with respect to the wheel frame 20. The elevation of the deck 16 can be adjusted with respect to the wheel frame 20. More particularly, the wheel frame includes a pivot shaft 24, as seen in FIG. 1, which is journaled around a shaft that connects to the deck 16. The wheel frame 20 includes a screw jack 26 that can be turned to either raise or lower the deck 16 with respect to the wheel frame 20.

Mounted to the deck 16 is an engine 30. Disposed adjacent the engine 30 is a gas tank 32. Although not specifically shown, engine 30 includes a vertical drive shaft that projects from underneath the deck 16 and drives a clutch assembly and a pair of drive sheaves. As will be appreciated from subsequent portions of this disclosure, the present invention envisions a belt drive for driving the respective mower decks 14. Hence, the drive sheaves associated with the drive shaft of the engine 30 are operative to impart driving torque to a pair of belts that extend from underneath the deck 16 to one or more driven sheaves associated with each of the mower decks 14.

Projecting forwardly from the deck 16 is a tongue indicated generally by the numeral 40. Tongue 40 includes a main section 42 and an adjustable link 44 that extends from the main section 42 and attaches to a draw bar or other connecting point of a tractor.

Turning to a discussion of each of the mower decks 14, each deck includes a housing 50. Secured to the housing are four wheels 52 with each wheel being provided with a height adjustment mechanism that permits the housing 50 to be adjusted with respect to the underlying ground. Extending around the front and sides of each housing 50 is a guard 54. Rotatively mounted underneath the housing 50 is one or more blades 56. In the embodiment illustrated herein, it is envisioned that the housing 50 would be sufficiently large to accommodate two blades 56. Although not shown, each blade is fixed to a rotating shaft having a driven sheave secured thereto.

As discussed above, it is contemplated that in one embodiment of the present invention, the drive associated with the mower system 10 for driving the blades 56 of the two mower decks 14 would constitute a series of belts 60. At least two of the belts 60 are trained around a drive shaft or clutch associated with the engine 30. Further, at least two belts 60 extend from the main frame deck 16 to a driven sheave associated with one blade 56 of each mower deck. In cases where two or more blades 56 are provided for each mower deck 14, multiple sheaves can be provided for transferring driving torque from blade-to-blade on the mower decks.

As seen in the drawings, particularly FIG. 1, each of the mower decks 14 is connected to the deck 16 of the main frame 12 such that as the main frame is pulled over the ground, the mower decks 14 disposed along the side of the main frame are likewise pulled over the ground. Accordingly, there is provided a pair of connecting assemblies or biasing assemblies, indicated generally by the numeral 80, that interconnect each mower deck 14 with the deck 16 of the main frame 12. Thus, each connecting assembly or biasing assembly 80 performs two principal functions. First, each connecting or biasing assembly 80 connects a mower deck 14 to the main frame 12. In addition, the connecting or biasing assembly 80 biases the mower deck 14 outwardly from the main frame 12. This effectively maintains the belts 60 in tension.

Figure 9:
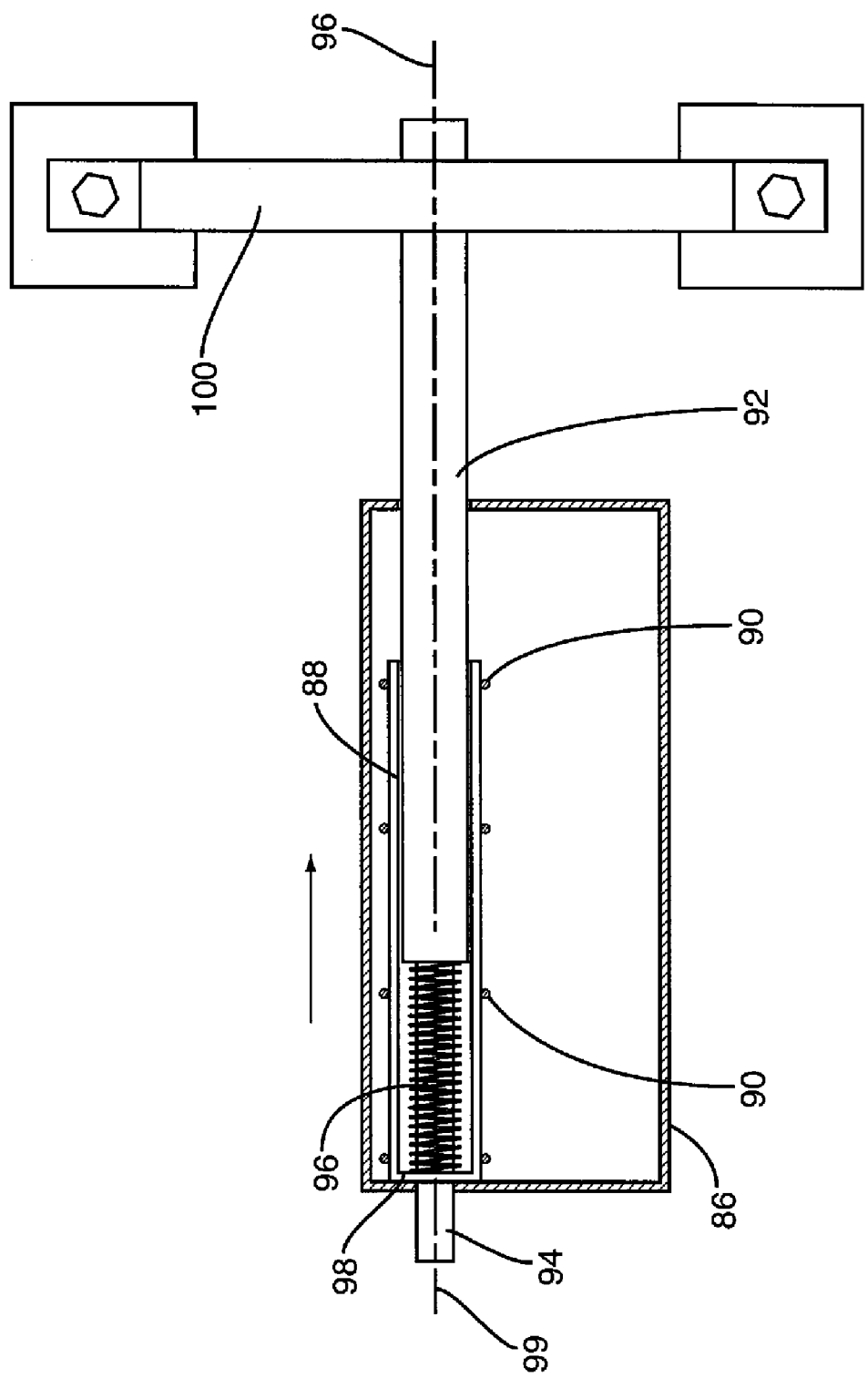
FIG. 9 is a fragmentary plan view illustrating a portion of a biasing assembly that forms a part of a connection between a main frame and a mower deck of the lawn mower system.

With respect to the connecting or biasing assembly 80, the same includes a U-shaped yolk 82 connected to the deck 16 of the main frame 12. Yolk 82 is pivotally connected to the deck 16 such that the yolk can pivot about a longitudinal axis indicated by the numeral 84 in FIG. 1. The longitudinal axis 84 is sometimes referred to as a first axis and extends in the direction of travel of the lawn mower system 10. Secured to the yolk 82 is a frame or box housing 86. Inside the box housing 86 is an outer sleeve 88 that is fixed with respect to the box housing by a series of U-bolts 90 that extend around the outer sleeve. See FIG. 9. Reciprocally mounted in the outer sleeve 88 is a telescoping member 92. The telescoping member 92 is slidable back and forth in the outer sleeve 88 and includes an extension 94. As seen in FIG. 9, a spring 96 extends around the extension 94 and seats or rests against a stop 98 that is secured to the outer sleeve 88. Stop 98 includes an opening that permits the extension 94 to move back and forth therein. The opposite end of spring 96 engages the telescoping member 92 at the point where the extension 94 begins. Hence, as viewed in FIG. 9, spring 96 biases the telescoping member 92 outwardly with respect to the main frame 12. Because of the presence of the U-bolts 90, the position of the outer sleeve 88 within the box housing 86 can be adjusted. By loosening the U-bolts 90, the outer sleeve 88 can be moved back and forth within the U-bolts and set at a selected position.

Figure 6:
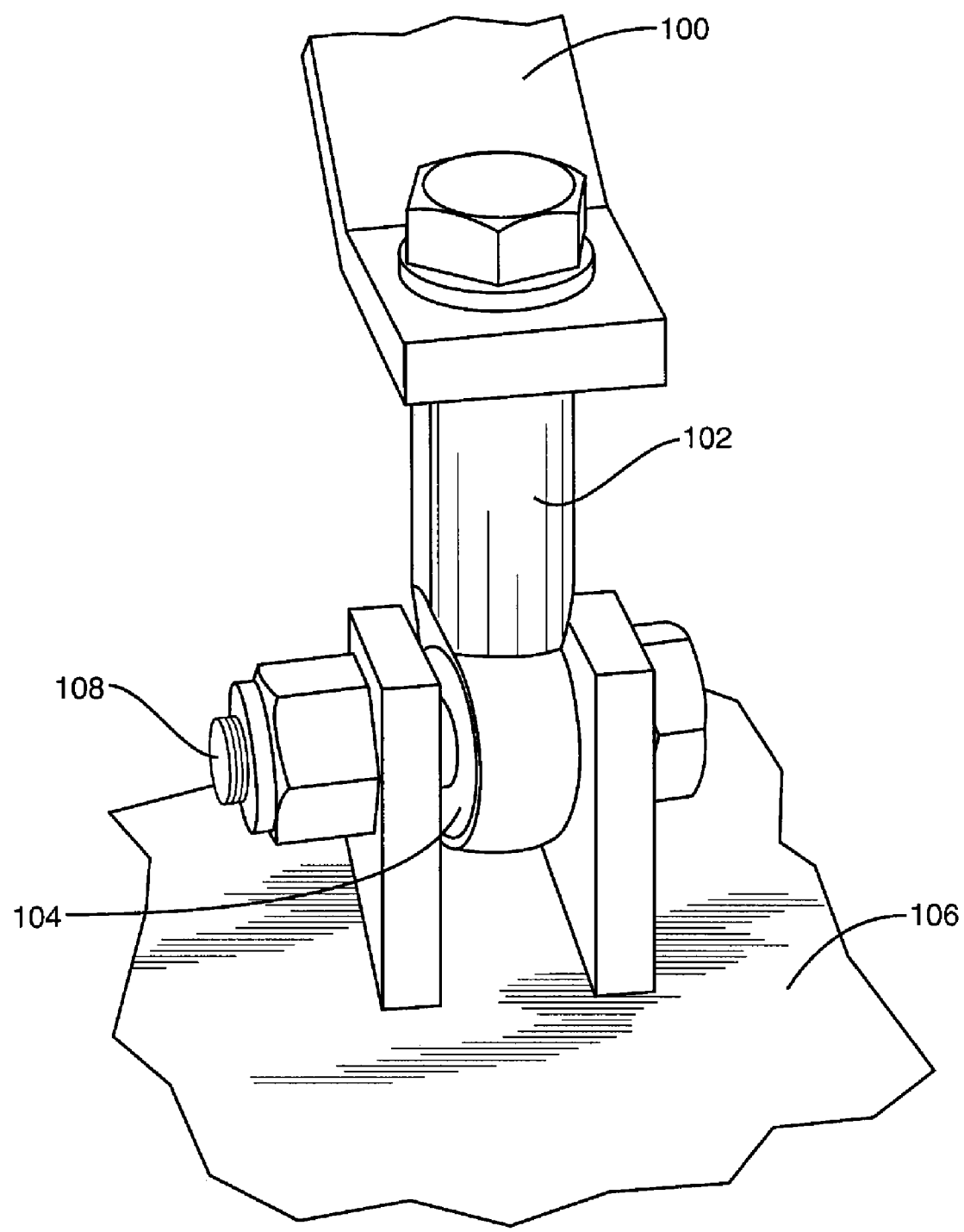
FIG. 6 is a fragmentary perspective view showing a connection that connects to a portion of the mower deck.
Figure 7:
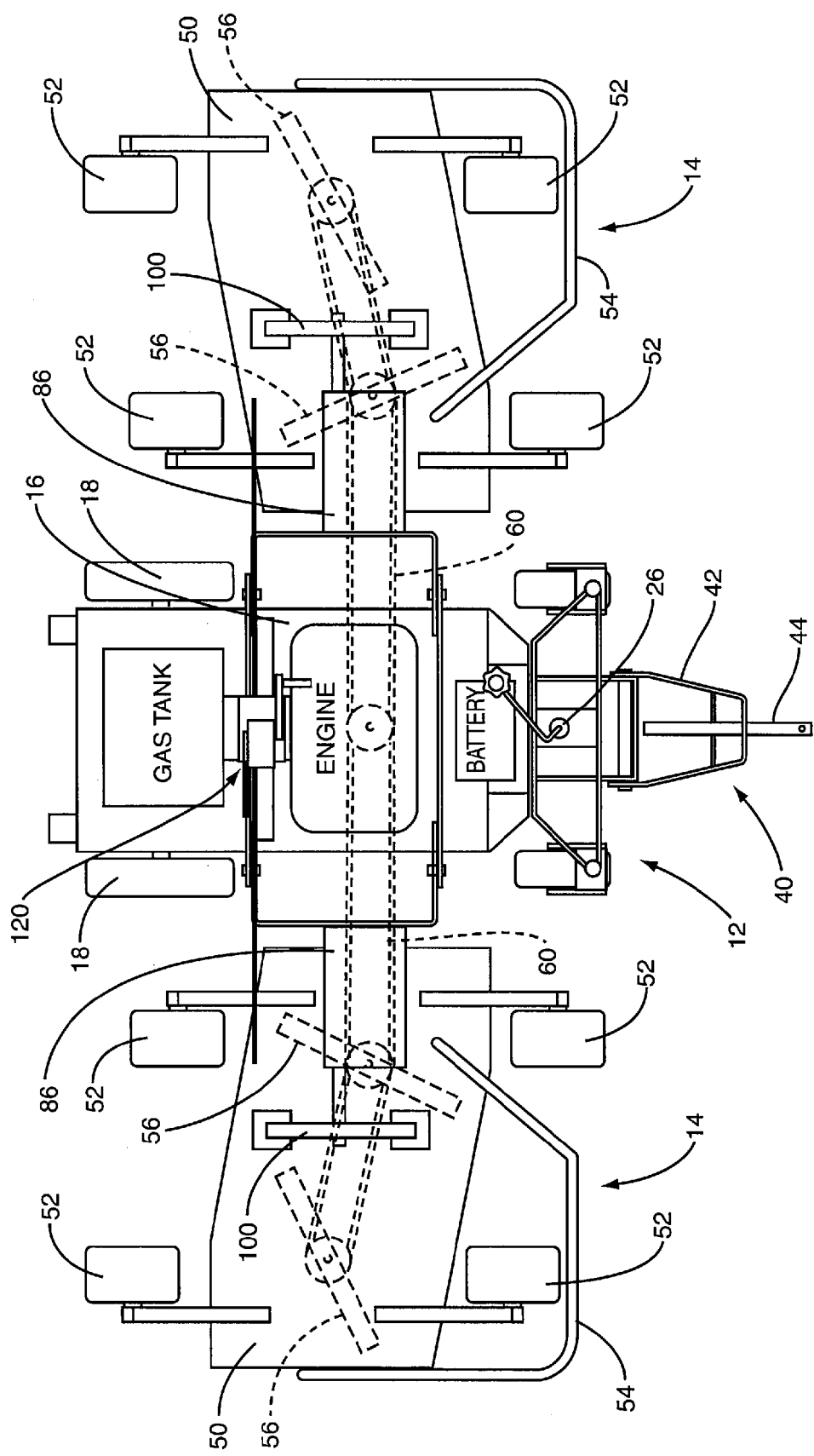
FIG. 7 is a top plan view of the lawn mower system.

Telescoping member 92 extends outwardly and connects to each mower deck 14. In particular, the telescoping member 92 of each connecting or biasing assembly 80 is rotatively connected to a connecting member 100. See FIG. 1. Connecting member 100 in turn is connected to a pair of connectors 102 that extend downwardly and connect to a pair of pads 106 that are secured to the top of the housing 50 of each mower deck 14. See FIG. 6. In particular, each connector 102 is in the form of a bolt and includes a lower portion that includes a spherical bearing 104 that is movably mounted within a race 104. A pin 108 extends through each spherical bearing 104 and connects to a pair of upstanding tabs that form a part of the pads 106.

Since telescoping member 92 is rotatively connected to the connecting member 100 that is in turn connected to the mower deck 14, it follows that the mower deck 14 can rotate about the axis of the telescoping member 92. This axis of rotation is referred to in FIG. 2 by the reference numeral 99. In addition, because of the two spherical bearings utilized to connect to the mower deck 14, the mower deck can rotate about a third axis referred to by the numeral 110 in FIG. 2. Hence, each mower deck can articulate or move about at least three axes, axis 84, axis 99 and axis 110. Note that axis 110 extends generally parallel to axis 84, while axis 89 extends generally perpendicular to axes 84 and 110.

Figure 5:
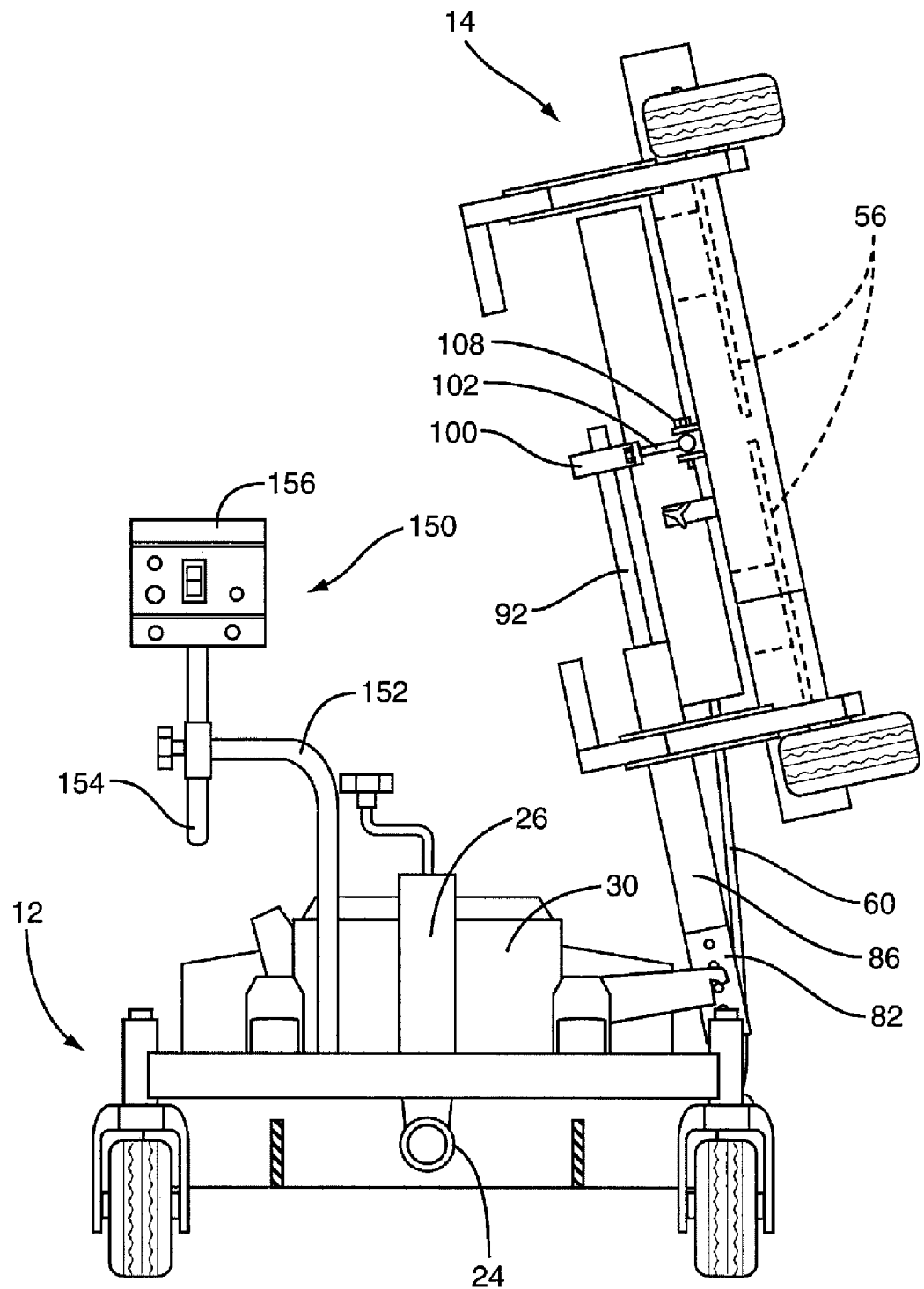
FIG. 5 is an elevational view showing a portion of the lawn mower system with one mower deck in an elevated stored position.
Figure 8:
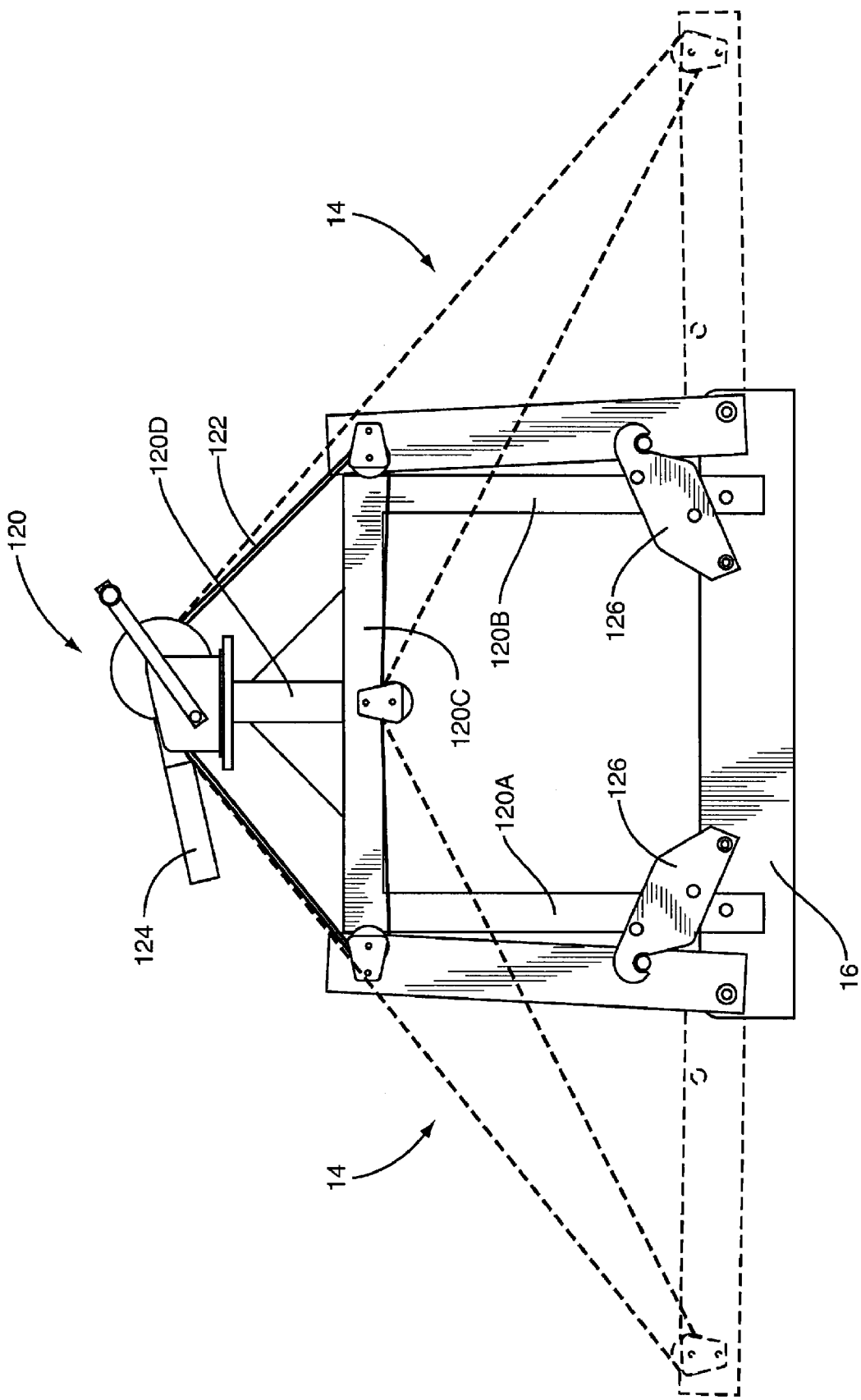
FIG. 8 is a schematic illustration showing a winch assembly for raising and lowering the two mower decks of the lawn mower system.

As illustrated in the drawings, each mower deck 14 can be rotated from an operative position shown in full lines in FIG. 1 to an inoperative or stored position shown in dotted lines in FIG. 5. In order to facilitate the raising and lowering of each mower deck 14, the lawn mower system 10 of the present invention is provided with a winch indicated generally by the numeral 120. See FIG. 8. Viewing FIG. 8, which schematically shows the winch 120 being mounted to the main frame 16 of the lawn mower system, it is seen that the winch includes a frame structure that supports the winch 120. This frame structure includes a pair of vertical members 120A and 120B. Connected between the vertical members 120A and 120B is a transverse member 120C. Extending upwardly from the transverse member 120C is a post 120D that supports the winch 120. Winch 120 is operatively connected to both mower decks 14 and can be utilized to raise each mower deck 14 from the operative position to the stored position. In the stored position, the mower deck assumes a position slightly past normal or 90°. This is illustrated in FIG. 5. Winch 120 includes a cable 122. One end of the cable is fixed while the other end is secured to the spool of the winch. Cable 122 is trained around two pulleys or connecting points on the mower decks 14. By winding cable 122 around the spool of the winch, the mower decks 14 will be raised from the operative position (full lines in FIG. 2) to the stored position, illustrated in FIG. 5. In addition, winch 120 is utilized to lower the respective mower decks 14. Winch 120 is provided with a hand operated friction brake 124. Thus, when the winch is allowed to free-wheel and permit the respective mower decks 14 to move from the stored position to the generally horizontal operative position, the operator can utilize the hand brake 124 to frictionally engage the rotating spool and generally brake the winch as the mower decks move downwardly. When the mower decks are disposed in the upright or stored position, the lawn mower system 10 is provided with a pair of locking tabs 126 that lock the mower decks 14 in the stored upright position. See FIG. 8.

To control the lawn mower system 10 there is provided a remote control system, indicated generally by the numeral 150, which is mounted to the main frame 12. Remote control unit 150 includes a post 152 that extends upwardly from the main frame deck 16. Adjustably secured to an end portion of post 152 is an adjustable rod 154. Mounted to the adjustable rod 154 is a housing 156. Housing 156 includes a number of controls that are designed to control various control functions of the lawn mower system. For example, the remote control unit 150 includes a key switch/starter, emergency off switch, a fuse port, etc.

From the foregoing specification and discussion, it is appreciated that the lawn mower system 10 of the present invention enables each of the mower decks 14 to move and articulate with respect to the main frame 12. For example, each mower deck 14 can rotate or move up and down about the longitudinal axis 84 as viewed in FIG. 2. In addition, the front and rear portions of each mower deck can move up and down and generally rotate about the axis 99 of the telescoping member 92. Finally, the spherical bearings 104 enable the mower deck 14 to rotate from side-to-side about axis 110, again as viewed in FIG. 2. This enables each mower deck to closely follow the terrain and general undulations of the underlying ground as the lawn mower system 10 traverses the ground. This yields a generally precise cut as each mower deck 14 is generally unencumbered by rigid linkages.

In addition, the mower decks 14 are biased outwardly by the connecting or biasing assemblies 80. This maintains a generally taut drive belt 60 extending from the main frame 12 to the individual mower decks 14.

Finally, the wheel frame 20 can be adjusted with respect to the main frame deck 16. Further, there is provided a pivot connection between the wheel frame 20 and the deck 16. This enables the deck 16 of the main frame 12 to be properly adjusted so as to maintain belt alignment. Deck 16, on each side, is provided with a belt guide through which the belt 60 extends as it connects the main frame 12 to the mower decks 14. Such belt guides are useful when the mower decks 14 experience extensive inclines. Various types of belt guides can be incorporated into opposite sides of the deck 16. In one embodiment each belt guide includes an opening and is provided with upper and lower rollers. Belt 60 is threaded through the opening and between the upper and lower rollers of the guide.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A gang-type lawn mower system comprising:
   a. a wheel supported main frame;
   b. an engine mounted on the main frame;
   c. a pair of laterally adjustable mower decks with each mower deck being laterally adjustable with respect to the main frame and disposed on each side of the main frame;
   d. each mower deck including one or more mower blades;
   e. a belt drive operatively connected to the engine and extending from the main frame to each of the mower decks for transferring power from the engine to each of the mower decks so as to drive the blades associated with the decks;
   f. a connecting assembly that connects each mower deck with the main frame such that the mower deck pivots about at least three axes with respect to the main frame;
   g. a biasing assembly interconnected between the mainframe and each of the mower decks for: 1) biasing each of the mower decks laterally away from the main frame; and 2) maintaining the belt drive in tension; and
   h. wherein the biasing assembly is laterally adjustable for varying the position of each mower deck with respect to the mainframe such that the position of each mower deck is laterally adjustable with respect to the mainframe so as to vary the cutting width of the mower decks.

2. The gang-type lawn mower system of claim 1 wherein each connecting assembly includes at least one spherical bearing that forms a connecting point, and wherein the spherical bearing is held within a race, and wherein the spherical bearing is movable within the race.

3. The gang-type lawn mower system of claim 2 including a connecting pin extending through an opening in the spherical bearing.

4. The gang-type lawn mower system of claim 1 wherein the connecting assembly includes a first axis for permitting the mower deck to rotate with respect to the main frame; a second axis for permitting the mower deck to rotate about a second axis with respect to the main frame; and wherein each connecting assembly includes at least one spherical bearing that permits the mower deck to move with respect to the main frame.

5. The gang-type lawn mower system of claim 4 wherein the first and second axes are disposed generally perpendicular to each other.

6. The gang-type lawn mower system of claim 5 wherein the first axis extends in a direction generally aligned with the direction of travel of the gang-type lawn mower system, and the second axis extends generally in a direction perpendicular to the direction of travel.

7. The gang-type lawn mower system of claim 1 wherein the main frame includes a deck for supporting the engine and a pair of front wheels connected to a wheel frame and wherein the wheel frame is connected to the deck of the main frame; and a height adjustment mechanism for adjusting the height of the deck of the main frame with respect to the wheel frame.

8. The gang-type lawn mower system of claim 7 wherein the wheel frame is pivotally connected to the deck of the main frame such that the wheel frame pivots with respect to the deck of the main frame.

9. The gang-type lawn mower system of claim 8 including a winch having a cable operatively connected to both the mower decks for raising and lowering the mower decks with respect to the main frame.

10. The gang-type lawn mower system of claim 9 wherein the winch includes a cable trained around a connecting point on each mower deck such that the winch is operative to raise and lower the mower decks.

11. The gang-type lawn mower system of claim 9 wherein each mower deck is movable between operative and transport positions, and wherein in the transport position the mower deck assumes a position slightly past a normal position.

12. The gang-type lawn mower system of claim 1 including a remote control unit mounted on the main frame.

13. The gang-type lawn mower system of claim 12 wherein the remote control unit includes a switch and a throttle.

14. A gang-type lawn mower system comprising:
   a. a wheel supported main frame;
   b. an engine mounted on the main frame;
   c. a pair of laterally adjustable mower decks with each mower deck being laterally adjustable with respect to the main frame and disposed on each side of the main frame;
   d. each mower deck including one or more mower blades;
   e. a belt drive operatively connected to the engine and extending from the main frame to each of the mower decks for transferring power from the engine to each of the mower decks so as to drive the blades associated with the decks;
   f. a biasing assembly interconnected between the main frame and each of the mower decks for: 1) biasing each of the mower decks laterally away from the main frame; and 2) maintaining the belt drive in tension; and
   g. each of the biasing assemblies being pivotally mounted to the mainframe about a longitudinal axis such that each biasing assembly biases one of the mower decks outwardly and permits the mower deck to move up and down about the longitudinal axis with respect to the mainframe; and
   h. wherein the biasing assembly is laterally adjustable for varying the position of each mower deck with respect to the mainframe such that the position of each mower deck is laterally adjustable with respect to the mainframe so as to vary the cutting width of the mower decks.

15. The gang-type lawn mower system of claim 14 wherein each biasing assembly comprises a yolk pivotally connected to the main frame and an extensible arm extending from the yolk and connected to one of the mower decks.

16. The gang-type lawn mower system of claim 15 wherein the biasing assembly includes a spring for biasing the extensible arm outwardly.

17. The gang-type lawn mower system of claim 14 wherein each biasing assembly includes at least a first telescoping member movable with respect to a second member and wherein the effective length of the biasing assembly can be adjusted by anchoring the second member in a plurality of different positions with respect to the main frame.

18. The gang-type lawn mower system of claim 14 wherein each mower deck is rotatable about a lateral axis associated with the biasing assembly.

19. The gang-type lawn mower system of claim 18 wherein each mower deck is rotatable about a longitudinal axis.

20. A gang-type lawn mower system comprising:
   a. a wheel supported main frame;
   b. an engine mounted on the main frame;
   c. a pair of laterally adjustable mower decks with each mower deck being laterally adjustable with respect to the main frame and disposed on each side of the main frame;
   d. each mower deck including one or more mower blades;
   e. a belt drive operatively connected to the engine and extending from the main frame to each of the mower decks for transferring power from the engine to each of the mower decks so as to drive the blades associated with the decks;
   f. wherein the main frame includes a deck for supporting the engine and a pair of front wheels connected to a wheel frame and wherein the wheel frame is connected to the deck of the main frame; and a height adjustment mechanism for adjusting the height of the deck of the main frame with respect to the wheel frame;
   g. a connecting assembly that connects each mower deck with the mainframe such that the mower deck pivots about at least three axes with respect to the mainframe;
   h. a biasing assembly interconnected between the mainframe and each of the mower decks for: 1) biasing each of the mower decks laterally away from the main frame; and 2) maintaining the belt drive in tension; and
   i. wherein the biasing assembly is laterally adjustable for varying the position of each mower deck with respect to the mainframe such that the position of each mower deck is laterally adjustable with respect to the mainframe so as to vary the cutting width of the mower decks.

* * * * *